United States Patent [19]

Garbe et al.

[11] 4,243,317

[45] Jan. 6, 1981

[54] CONTACT PRINTING APPARATUS

[75] Inventors: William F. Garbe; Joseph J. Wrobel, both of Rochester, N.Y.

[73] Assignee: Eastman Kodak Company, Rochester, N.Y.

[21] Appl. No.: 52,537

[22] Filed: Jun. 27, 1979

[51] Int. Cl.³ .............................................. G03B 27/20
[52] U.S. Cl. ........................................ 355/91; 355/99
[58] Field of Search ................... 430/396, 300, 311, 5; 355/91, 99, 85, 87, 79, 102

[56] References Cited

U.S. PATENT DOCUMENTS

| | | | |
|---|---|---|---|
| 3,689,153 | 9/1972 | Suzuki | 355/91 X |
| 3,768,906 | 10/1973 | Michelson et al. | 355/91 X |
| 4,029,404 | 6/1977 | Mizukami et al. | 355/91 |
| 4,065,210 | 12/1977 | Milburn | 355/91 |
| 4,089,603 | 5/1978 | Jacobs | 355/91 X |
| 4,201,581 | 5/1980 | Thomas et al. | 355/91 X |

*Primary Examiner*—Richard A. Wintercorn
*Attorney, Agent, or Firm*—Donald W. Strickland

[57] ABSTRACT

Apparatus and method are disclosed for contact printing information from a master record carrier onto a replicate material of a type that emits gas during the contact print exposure (e.g., a diazo-film emulsion). It has been discovered that the emitted gas acts as an efficient lubricant of the master-replicate interface and contributes to relative movement between the master record carrier and the replicate material during the contact print exposure. In the case of videodisc replication, wherein video information is recorded in the form of billions of micron-sized apertures, such relative movement severely degrades the replicated imagery. To limit such relative movement, a preferred embodiment of the present invention provides contact printing apparatus, including a specially filtered exposing source, that substantially eliminates relative movement between the master record carrier and the replicate material.

13 Claims, 15 Drawing Figures

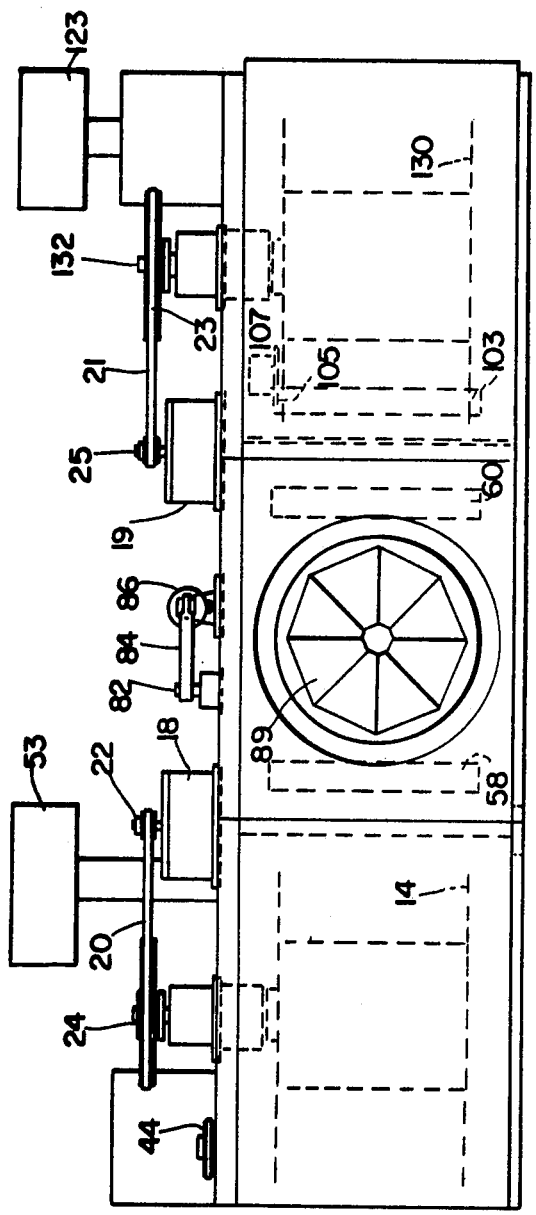
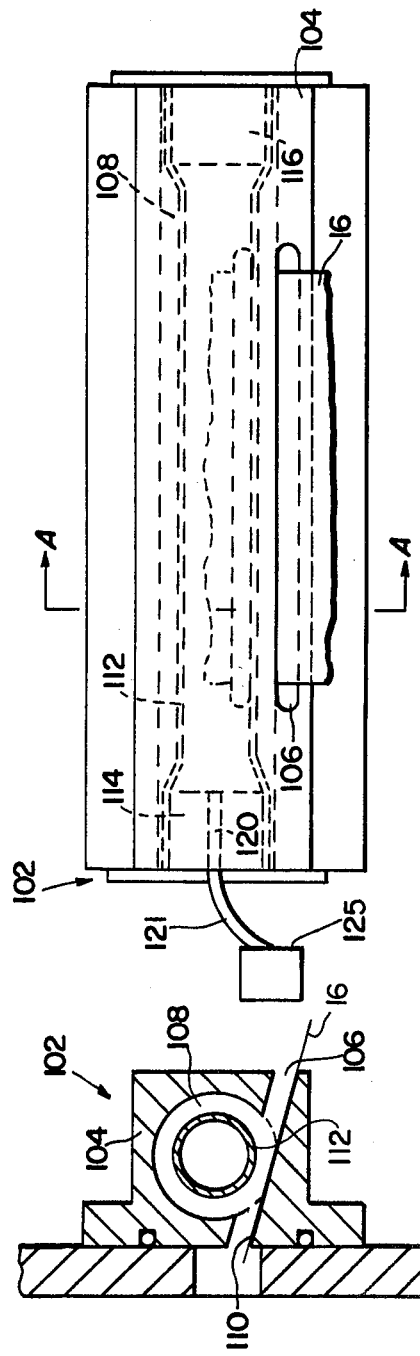

CONTACT PRINTING APPARATUS

FIELD OF THE INVENTION

The present invention relates to apparatus and method for contact printing information from a master record carrier onto a replicate material and, more particularly, to such apparatus and method for limiting relative movement of the master record carrier and the replicate material during the contact print exposure.

DESCRIPTION RELATIVE TO THE PRIOR ART

The replication process used to produce replicate videodiscs from a master is important in determining the commercial feasibility of mass produced videodiscs. Of all the known videodisc replication processes (compression molding, embossing, injection molding, etc.), optical contact printing is potentially the most useful. To replicate by contact printing, all that is necessary is that the master and replicate material be brought into contact, a contact print exposure made, and the replicate material processed in a conventional manner. Optical contact printing has not yet found widespread application as a replication process for videodiscs, however, because of the extremely high spatial frequencies involved in video recording, and because of the large area over which video information is recorded. Typically, a standard videodisc is 30 cm in diameter and contains billions of discrete, micron-sized apertures.

In an attempt to contact print replicate such a videodisc onto a diazo replicate material, apparatus was constructed wherein a pressure pad in the form of an inflatable rubber diaphragm was used to press the master record carrier and diazo replicate material into close contact. The contact print exposure was made using a high intensity xenon flashlamp. The resultant replicate videodisc, when played back on a video monitor, produced an unstable picture that had a low signal-to-noise ratio and was generally devoid of high frequency information. Microscopic examination of the replicated imagery revealed that the apertures, which were well-defined and generally circular or elliptical in shape on the master, had been distorted during the "replication" process into ill-defined, tadpole shaped images with tails, or streaks, many times the length of the original aperture. Moreover, the tails were generally, although not exactly, disposed toward the center of the replicated videodisc. The cause of this unusual type of distortion was unknown.

As disclosed in U.S. Patent Application Ser. No. 52,361 filed on even date herewith in the names of David S. Smith and Leroy Cooley, further investigation of the problem led to the discovery that relative movement of the master and replicate material during the contact print exposure was the cause of the observed distortion. The cause of such movement was determined to be the result of several interactive factors: Initially, an inflated rubber diaphragm presses the master and replicate material into close contact. During the contact print exposure, however, the diazo replicate material emits nitrogen gas, the pressure of which counteracts the applied force pressing the master and replica together, thereby causing the master and replicate material to separate. Even though the amount of released gas is small, and the separation is thus only slight, the nitrogen gas acts as an efficient lubricant of the master-replicate interface. The lubricated master-replicate interface enables tensional and compressional forces in the rubber diaphragm to cause the replicate material to stretch or shrink, thereby giving rise to a major portion of the observed distortion pattern. To prevent tensional and compressional forces in the rubber diaphragm from being transmitted to the master-replicate sandwich, U.S. Patent Application Ser. No. 52,361 discloses, in one embodiment, the use of an isolating member disposed between the rubber diaphragm and the master-replicate sandwich. The isolating member is flexible to conform to the contour of the master-replicate sandwich, yet stiff (i.e., resistant to stretch and shrinkage due to applied strain forces) to isolate the master-replicate sandwich from tensional and compressional forces in the rubber diaphragm.

SUMMARY OF THE INVENTION

Use of an isolating member eliminates the major portion of the streak distortion, and replicates so produced are useful for certain applications. Some distortion remains, however, and for those applications wherein the highest fidelity is important it is desirable to eliminate this residual distortion. It has been discovered that as nitrogen gas is released during the contact print exposure, a slight relative movement occurs between the master and replicate devices, not because of strain forces in the rubber diaphragm but, rather, because of differential thermal expansion of the master and replicate devices. The present invention provides a specially filtered source of radiation for use in making the contact print exposure, the use of which substantially eliminates relative thermal expansion of the master and replicate devices. Using the filtered source of radiation in combination with an isolating member (or its equivalent) virtually eliminates the observed distortion pattern.

BRIEF DESCRIPTION OF THE INVENTION

In the detailed description of the preferred embodiments of the invention presented below, reference is made to the accompanying drawings, in which:

FIGS. 1, 2 and 3 are front, side and top sectional views respectively of a videodisc replication machine;

FIGS. 5a and 5b are detail drawings of a sealport device used in the replication machine of FIGS. 1, 2 and 3, FIG. 5b being a section view along line A—A of FIG. 5a;

Figure 6:
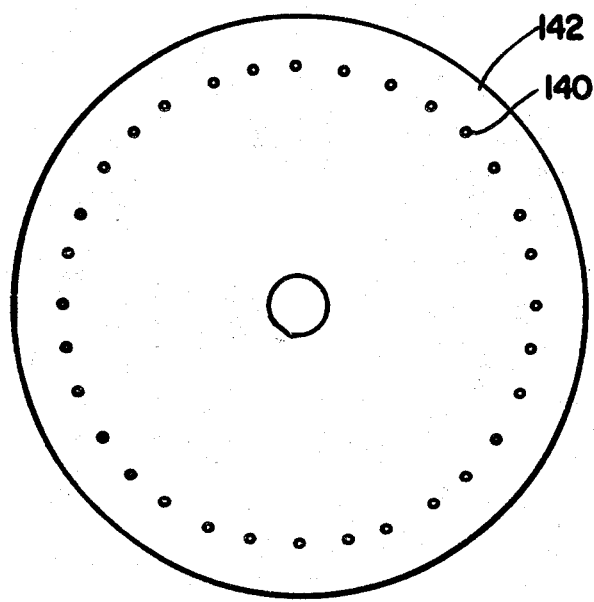
FIG. 6 shows a master record carrier wherein the size of the images has been greatly exaggerated.
Figure 7:
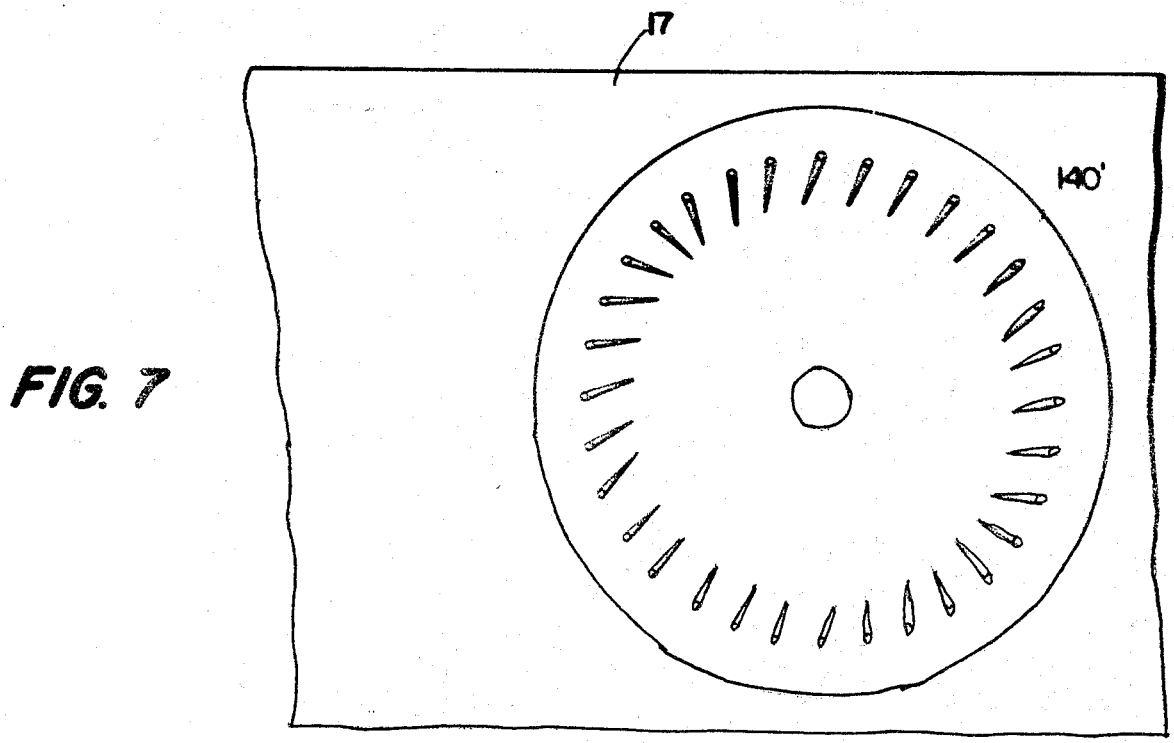
Figure 8:
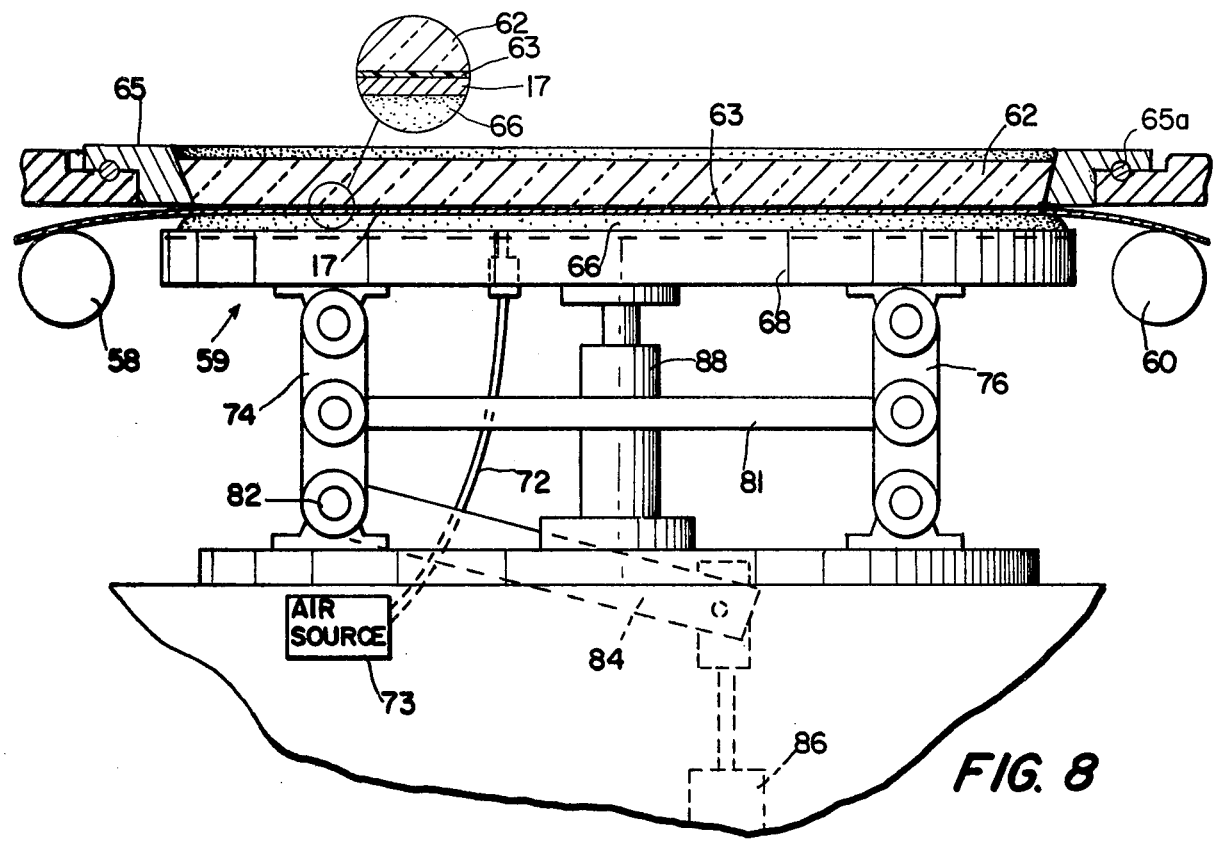
Figure 9:
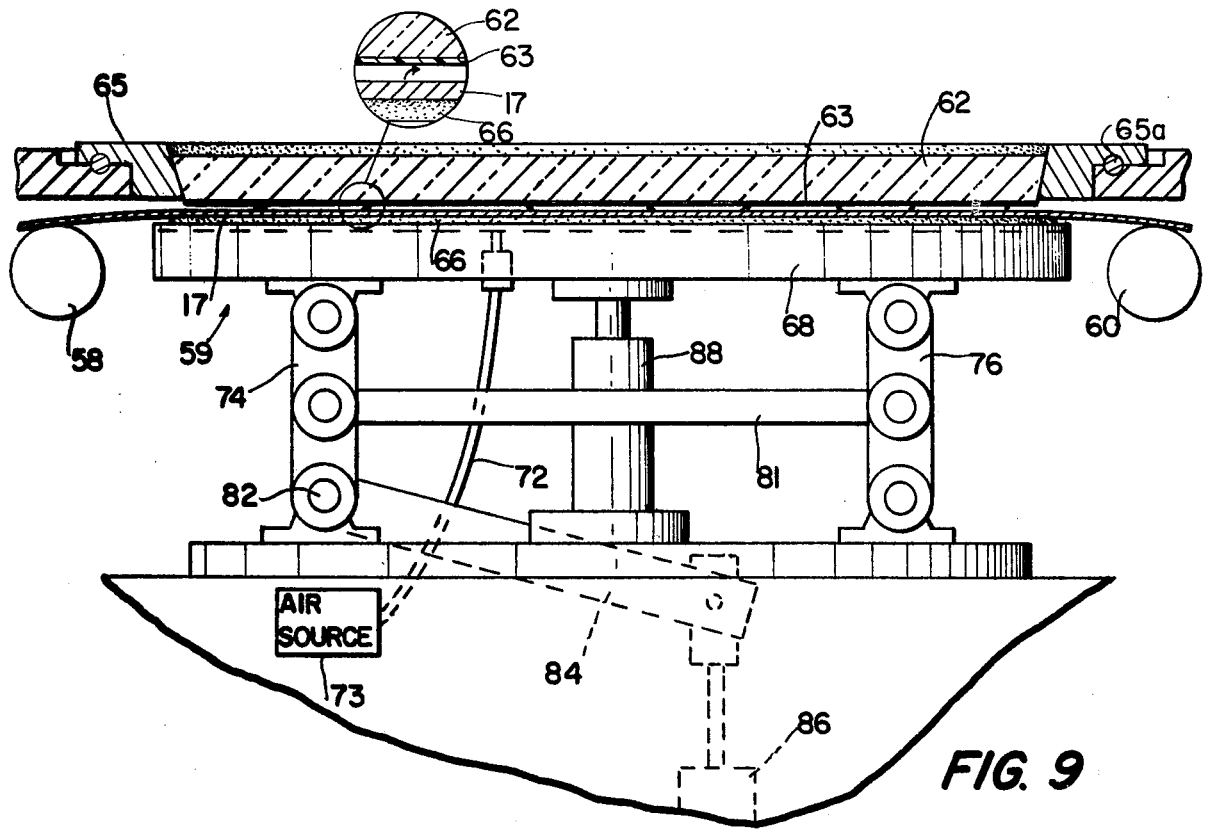
Figure 10:
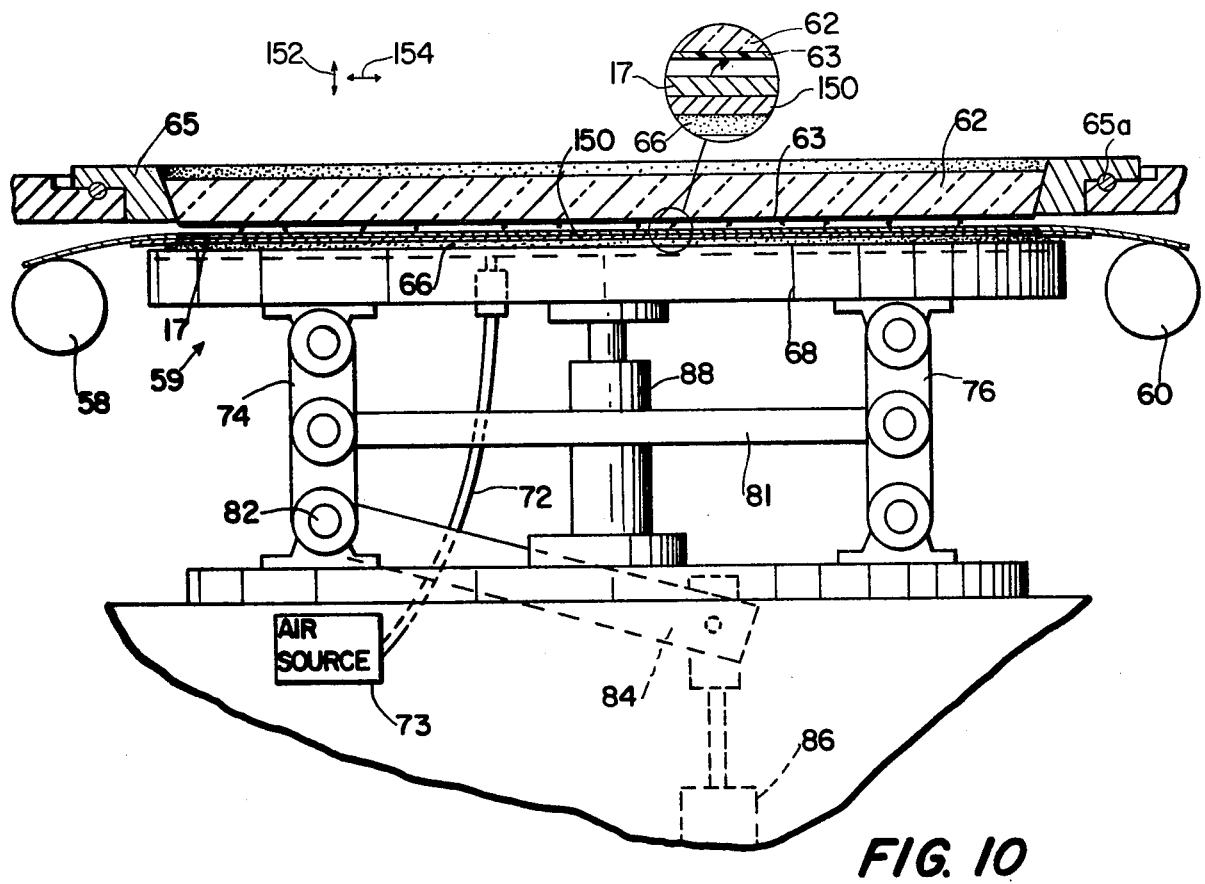
Figure 11:
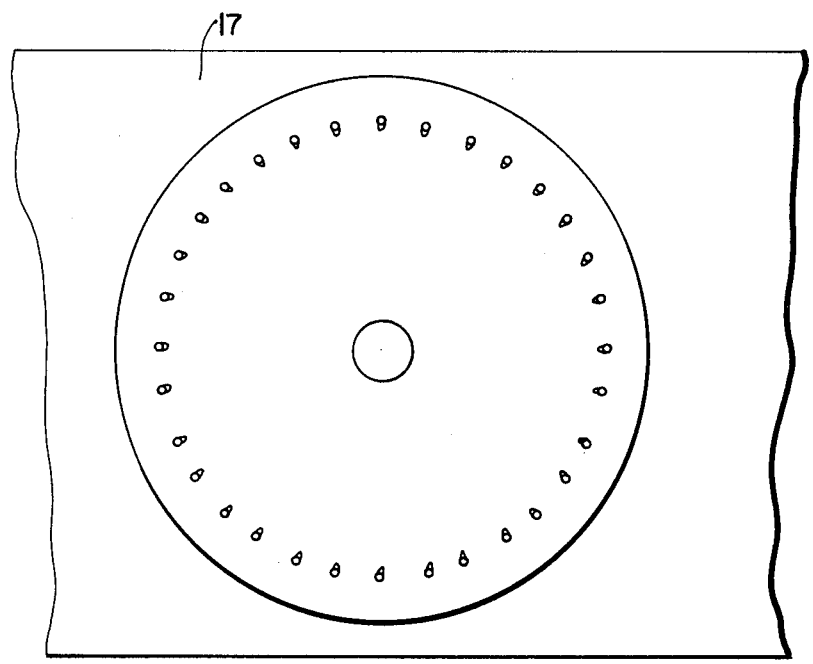
Figure 12A:
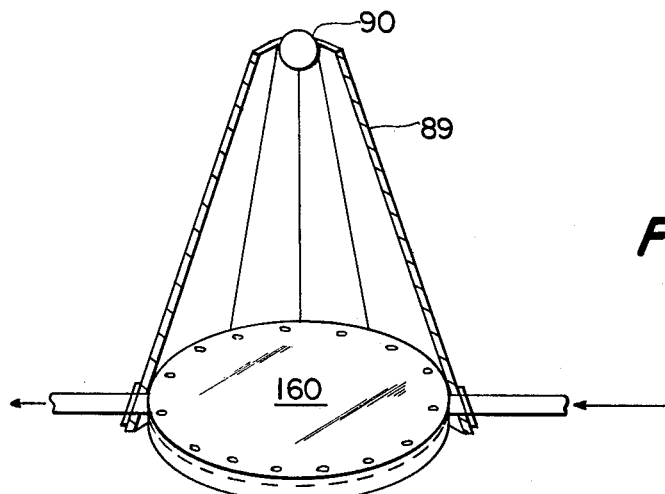
Figure 12B:
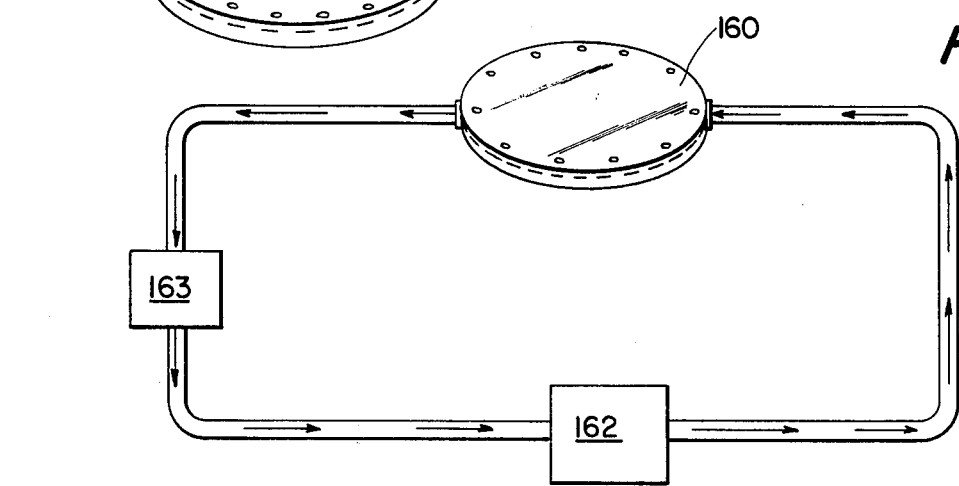

FIG. 7 qualitatively shows the result of contact printing the master record carrier of FIG. 6 onto a diazo replicate material;

FIGS. 8, 9 and 10 are illustrations useful in describing the use of an isolating member; and FIGS. 11, 12a and 12b are illustrations useful in describing a filtered source of radiation and its use in accordance with the present invention.

DESCRIPTION OF THE PREFERRED EMBODIMENTS

The present invention relates to improved apparatus for use in contact printing information from a master record carrier onto a replicate material. It will be understood that the term "contact printing" as used throughout the specification and claims includes that type of replication which is sometimes referred to as "proximity contact printing" wherein a master record carrier and a replicate material are brought into close proximity for a contact print exposure. References to the effect that two surfaces are brought into contact are to be construed, therefore, as including the case where the surfaces are brought into close proximity.

A videodisc replication machine is shown in FIGS. 1, 2, 3, 4a, 4b, 5a and 5b. The replication machine is described in detailed in U.S. Patent Application Ser. No. 52,532, filed on even date herewith in the name of David S. Smith, and hereby incorporated by reference. Since, in one form, the present invention takes the form of improvements to the replication machine, the basic replication machine will be briefly described. It will be apparent to those skilled in the art, however, that the present invention has utility in the general field of contact printing. By way of overview, the replication machine shown in the drawings generally includes three major sections: (1) a supply chamber wherein the replicate material is degassed and its photosensitive surface cleaned of foreign particles, (2) an exposure station including an exposure chamber (which can be evacuated) containing a pressure platen or other means for bringing the replicate material and the master record carrier into close contact for the contact print exposure, and (3) a takeup chamber for storing exposed replicate material, the takeup chamber being separated from the exposure chamber by a sealport device which, when activated, permits the takeup chamber to be brought up to atmospheric pressure without substantially affecting the vacuum condition in the exposure chamber.

Figure 1:
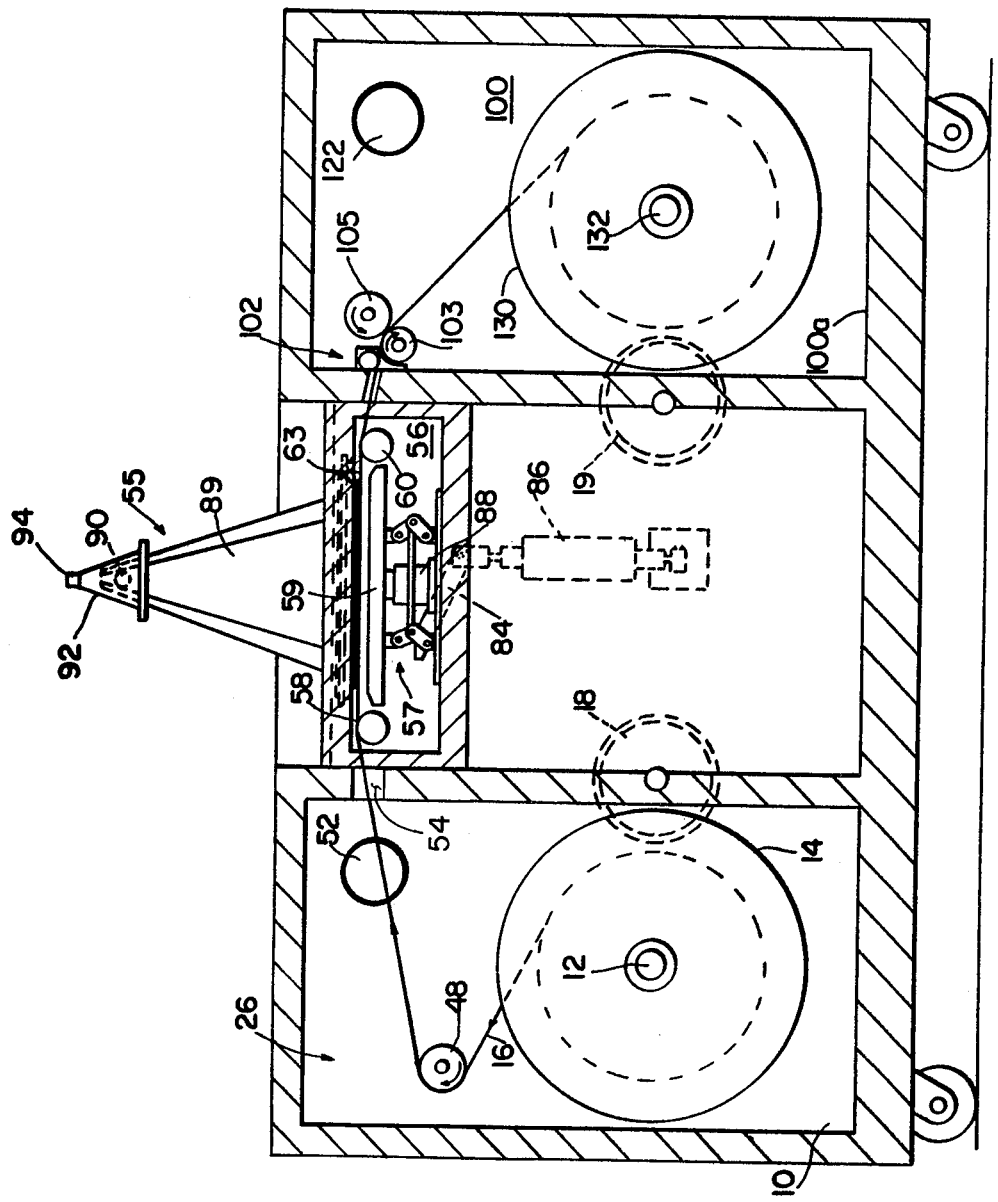
Figure 2:
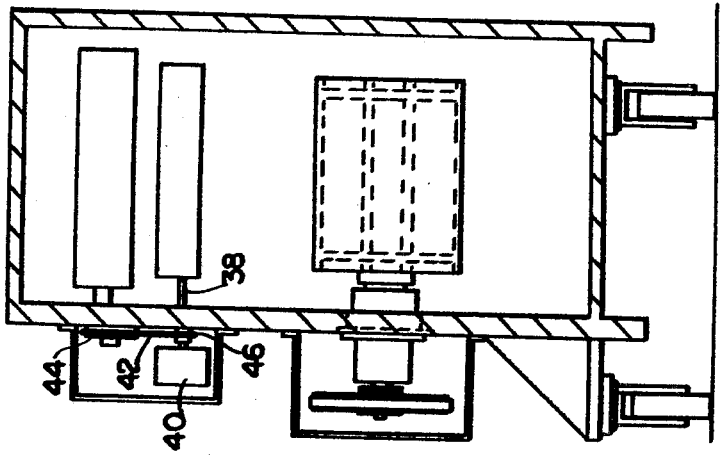

Referring to FIG. 1, an airtight supply chamber 10 contains a spindle 12 for receiving a supply reel 14 of a replicate material 16. The spindle 12 is driven by a torque motor 18 through a belt 20 and pulley 22, 24 arrangement as shown in FIG. 3. The replicate material 16 passes over a guide roller 48 and enters an exposure station through a port 54.

The exposure station comprises three main components: (1) a source of radiation 55, (2) an exposure chamber 56 and (3) a pressure platen device 57. The replicate material 16 enters the exposure chamber 56 through the port 54 and is guided over the pressure platen device 57 by a pair of guide rollers 58, 60. The exposure chamber 56 is in fluid communication with the supply chamber 10, via port 54, and is thus maintained at a vacuum level approximately equal to that in the chamber 10. The pressure platen device 57 shown in FIGS. 1, 4a and 4b has a resilient pressure pad assembly 59 which is generally disc shaped, having a diameter of about 35 cm. This configuration matches a master record carrier 63 laminated on a glass support disc 62. The support disc 62 is glued to a metal mounting ring 65 to securely hold the disc 62 in place. An "O" ring 65a provides a seal between the mounting ring 65 and the machine frame.

Figure 4A:
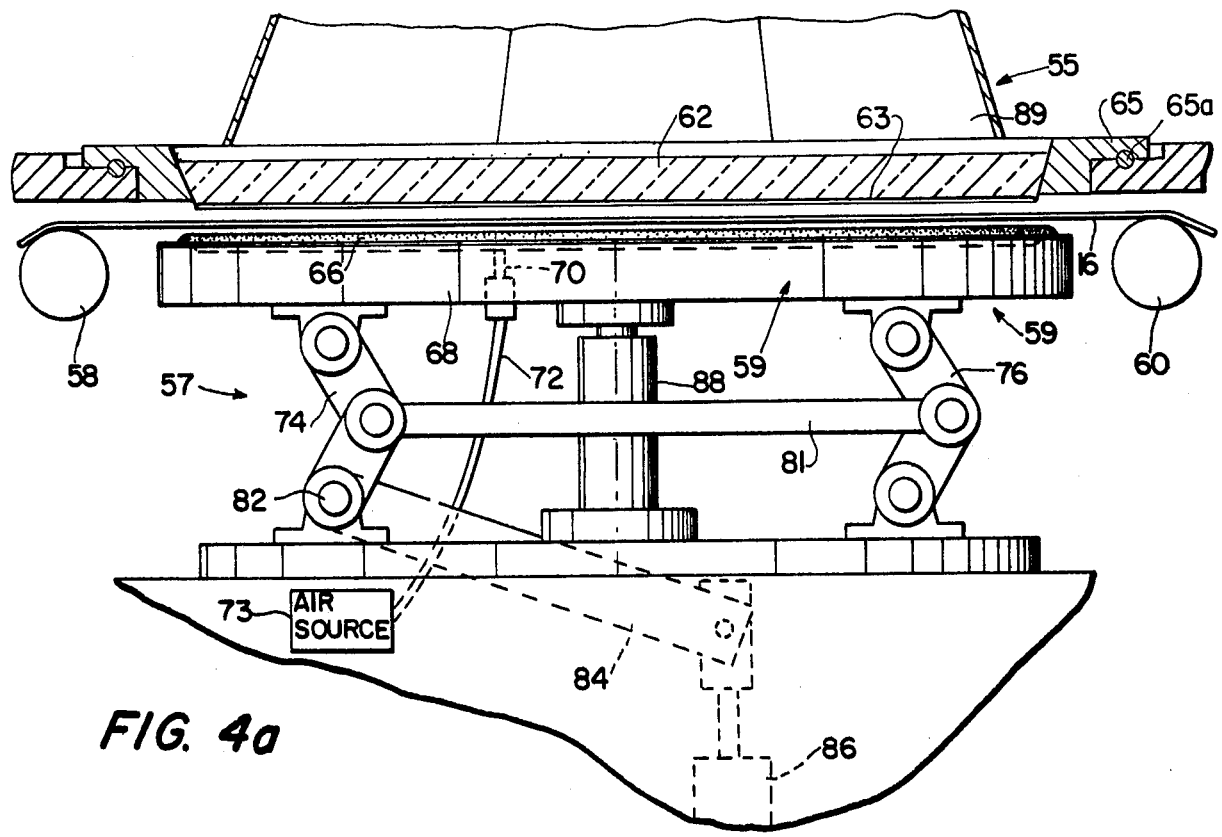
FIGS. 4a and 4b are detail drawings partly in section showing certain aspects of an exposure station in the replication machine of FIGS. 1, 2 and 3.
Figure 4B:
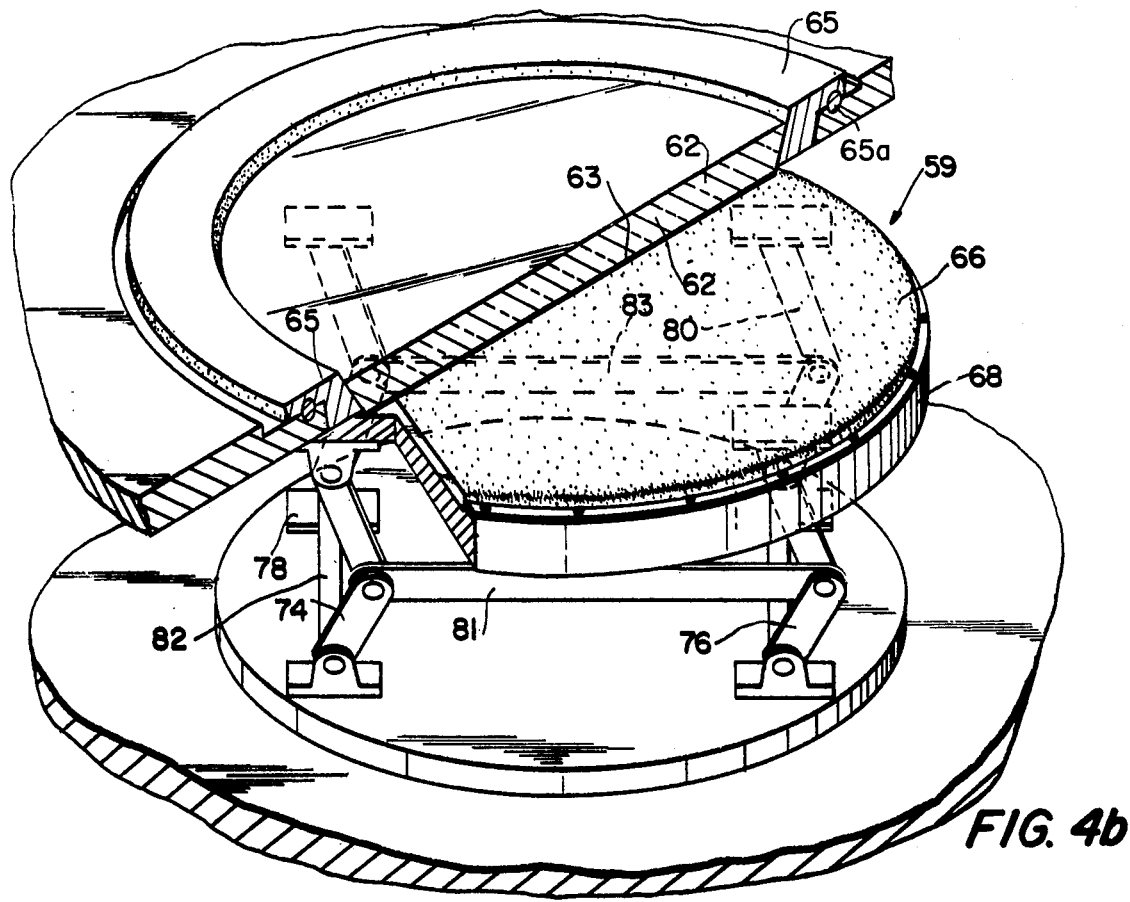

The pressure pad assembly 59 is shown most clearly in FIGS. 4a and 4b. The pressure pad assembly 59 has a fabric-reinforced rubber diaphragm 66 clamped at the edge to a disc-shaped plate 68. The disc-shaped plate 68 has a port 70 which is connected via a supply hose 72 to an external air source 73. A linkage mechanism comprised of four link arrangements 74, 76, 78 and 80, joined by a pair of crosslinks 81 and 83, supports the pressure pad assembly 59. The linkage mechanism is actuated by rotation of a drive shaft 82 by means of a drive arm 84 connected to an air cylinder assembly 86. As shown most clearly in FIG. 3, the air cylinder assembly 86 and the drive arm 84 are external to and mounted on the housing of the replication machine. In response to actuation of the air cylinder assembly 86, rotation of the drive shaft 82 causes the four link arrangements 74, 76, 78 and 80 to drive the pressure pad assembly 59 toward the master record carrier 63. Linear movement of the pressure pad assembly 59 is ensured by the cooperation of a linear guide device 88 with the linkage arrangement. The linkage arrangement drives the pressure pad assembly 59 to touch the underside of the replication material 16 and to press it against, or in light contact with, the master record carrier 63. The rubber diaphragm 66 is then inflated to press the photosensitive surface of the replicate material 16 into close contact with the information bearing surface of the master record carrier 63. The vacuum condition maintained in the exposure chamber 56 facilitates such contact.

A source of radiation 55 is then flashed to expose the replicate material 16 through the master record carrier 63 with actinic radiation. The radiation source 55 shown in FIGS. 1, 3 and 4a is the subject of U.S. Patent Application Ser. No. 914,105, filed June 9, 1978 in the name of William F. Garbe, and hereby incorporated by reference. Briefly, referring to FIG. 1, the radiation source 55 includes a reflector 89 comprised of a pyramidal arrangement of generally planar reflective surfaces formed, for example, from sheet aluminum. A source such as a xenon flash lamp 90 is disposed within the reflector 89 and positioned so that the reflective surfaces form a spherical array of virtual images of the source. It has been found that such a radiation source satisfactorily exposes the standard, 30 cm diameter master videodisc. Other sources of radiation are also useful with the disclosed replication machine as long as they adequately illuminate with actinic radiation the particular master record carrier that is to be replicated.

After the contact print exposure has been made, the rubber diaphragm 66 is deflated and the air cylinder 86 is actuated to lower the pressure pad 59 to its original position. The exposed replicate material 16 is then advanced into a takeup chamber.

The takeup chamber 100 is isolated from the exposure chamber 56 by a sealport device 102. Referring to FIGS. 5a and 5b, the sealport device 102 is comprised of a housing 104 having a passage 106 through which the replicate material 16 passes. A cylindrical hole 108 is bored through the length of the housing tangent to the lower surface 110 of the passage 106. A length of rubber tubing 112 is stretched inside the hole 108 and is fastened at both ends to cylindrical plugs 114, 116. The rubber tubing 112, in its uninflated state, is smaller in diameter than the hole 108 by about twice the passage 106 height so that the web of replicate material 16 does not touch the rubber tubing 112. The cylindrical plug 114 has an air port 120 through which air under pressure flows from an air tube 121 connected to an air source 125 to inflate the rubber tubing 112. The inflated rubber tubing 112 fills the hole 108 and presses the replicate material 16 against the lower surface 110 of the passage 106 with sufficient force and over a sufficient area to effectively seal the takeup chamber 100 from the exposure chamber 56, thereby providing vacuum isolation of the two chambers.

The purpose of the sealport device 102 is two-fold. First, it is often desired to open the takeup chamber 100 in order to monitor the quality of the replicated video information. To do this, a section of the exposed replicate material is removed from the takeup chamber 100, processed and examined. Absent the sealport device 102, opening of the takeup chamber 100 would cause the vacuum in the exposure and supply chambers 56 and 10 respectively to be lost. In addition the replicate material 16 would absorb moisture from the air. As a result, when the takeup chamber 100 is closed it would then be necessary to re-evacuate the supply, exposure and takeup chambers 10, 56 and 100. Because of the relatively large volumes involved, and because of outgassing, the re-evacuation would consume considerable time, e.g., about 30 minutes or so, depending upon the capacity of the pumping system. The sealport device 102 permits the takeup chamber 100 to be isolated from the exposure chamber 56 (and thus the supply chamber 10). The takeup chamber 100 can thus be opened, replicate material 16 removed, and the takeup chamber closed without substantially affecting the vacuum condition in the remainder of the replication machine. Before the sealport device 102 is opened, the takeup chamber 100 is re-evacuated through a vacuum port 122 connected to a vacuum pump 123 (see FIG. 3).

The second purpose of the sealport device 102 is to prevent foreign particles which enter the takeup chamber 100 during repressurization from contaminating other sections of the replication machine. By evacuating the takeup chamber 100 before opening the sealport device 102, any foreign particles which have entered the takeup chamber 100 are removed or fall to the chamber floor 100a. Foreign particles in the takeup chamber 100 are not nearly so undesirable as in the supply or exposure chambers, however, because the contact print exposure has already been made, and subsequent processing is generally not critically sensitive to foreign particles.

In normal operation, the tubing 112 is uninflated to allow advancement of the replicate material through the sealport device 102. When it is desired to open the takeup chamber without affecting the remainder of the replication machine, the rubber tubing 112 is inflated and presses the replicate material 16 against the lower surface 110 of the passageway 106 to form a vacuum seal.

Upon passing through the sealport device 102, the replicate material 16 passes over a roller 103. A wheel 105 contacts the roller 103 and is rotated thereby. The wheel 105 is used to drive a web footage indicator 107 (FIG. 3) to allow accurate positioning of an exposure on the replicate material 16.

The replicate material 16 is wound onto a reel 130 mounted on a takeup reel spindle 132. A torque motor 19 drives the spindle 132 via a belt 21 and pulley 23, 25 arrangement as shown in FIG. 3. To advance the replicate material 16 from the supply reel 14 to the takeup reel 130, the torques of the supply and takeup spindle drive motors 18 and 19 are adjusted to produce a net positive torque on the takeup spindle 132, so as to accelerate the takeup spindle 132 and takeup reel 130 while maintaining web tension constant. The web tension and the torque of the supply spindle motor 18 together accelerate the supply reel 14. To stop advancement of the replicate material 16 while maintaining web tension at the same level, the torque of the supply spindle drive motor 18 is increased to decelerate the supply reel 14, and the torque of the takeup motor 19 is decreased.

The decreased replication machine produces satisfactory results when used with a variety of replicate materials. Upon using a diazo replicate material, however, a distortion pattern was observed in the replicated image. FIG. 6 shows an image array in the form of micron-sized apertures 140 on an original master record carrier 142. The apertures 140 are greatly exaggerated in size and only one ring of such apertures is shown. (Were the master record carrier 142 a video recording, for example, the record carrier 142 would be covered with billions of such micron-sized apertures.) FIG. 7 shows the result of using the described replication machine to contact print the information on the master record carrier 142 onto a diazo replicate material 17 in web form. The replicate material 17 has an ESTAR (polyethylene terephthalate) support. As can be seen, a peculiar distortion pattern has appeared which has been found to be repeatable from print-to-print.

It has been discovered that the distortion pattern is caused by relative movement of the master record carrier 142 and the diazo replicate material 17 during the contact print exposure. Such relative movement is not a simple sliding since the streaks do not extend in the same direction. Based upon the streak pattern, the relative movement is much more complicated, apparently involving both a radial component of movement and at least two non-colinear components. Moreover, the density of a replicated aperture 140' is not uniform. Each replicated aperture appears to be comprised of a generally circular image (corresponding to the original image on the master) having a streak, or tail, extending therefrom of greater density (assuming transparent apertures in the master and a positive diazo film system). To explain Applicants' present understanding of the observed distortion pattern, reference is now made to FIGS. 8, 9 and 10. The contact printing process begins by bringing a master record carrier 63 into close contact with a diazo replicate material 17, as shown in FIG. 8. The diazo replicate material 17 is comprised of a support material (e.g., polyethylene terephthalate) and a diazo emulsion. The diazo emulsion contains a diazonium salt that is highly absorbtive to actinic radiation, usually in the 400 nm range. See, for example, Glafkides, Photographic Chemistry, (1960), Vol. 2 at 715–726. Upon exposure to actinic radiation, nitrogen gas is formed. The diazo replicate material 17, therefore, emits nitrogen gas during the contact print exposure. The released nitrogen gas forces the master record carrier 63 and the replicate material 17 to separate slightly as shown in FIG. 9. Even though this separation is slight, the nitrogen gas forms an air bearing that acts as an efficient lubricant of the master-replicate interface.

Two sources are believed to be responsible for causing relative movement of the master record carrier 63 and the replicate material 17. First, tensional forces and compressional forces in the rubber diaphragm 66 are believed to be transmitted to the replicate material 17 and cause it to stretch (tensional force) or shrink (compressional force) relative to the master record carrier 63. Since the rubber diaphragm is disc-shaped, the tensional and compressional forces tend to be radially disposed, thereby accounting, to the best of Applicants' knowledge, for at least part of the radial component of relative movement between the master record carrier 63 and the replicate material 17. This effect would not occur when a replicate material that does not emit gas during the contact print exposure is used because the master record carrier and the replicate material are tightly pressed together and remain so during the contact print exposure. As a result, tensional or compressional forces transmitted from the diaphragm to the replicate material have little, if any, effect because frictional engagement of the master record carrier and the replicate material inhibit its stretching or shrinking. Further, the tensional or compressional forces are transmitted through the replicate material to the master record carrier, so both the master record carrier and the replicate material stretch or shrink together.

According to Applicants' present understanding, the second source of relative movement between the master record carrier 63 and the replicate material 17 is relative thermal expansion of the replicate material 17 and the master record carrier 63. Such thermal expansion occurs during the contact print exposure as the master and replicate material absorb thermal energy. It is believed that the anisotropic nature of the ESTAR (polyethylene terephthalate) support (due to biaxial crystal structure) of the replicate material 17 causes nonuniform thermal expansion and gives rise to the nonradial component of relative movement. Other support materials, such as cellulose acetate, may exhibit different thermal expansion properties and thus produce a different distortion pattern.

To prevent relative movement of the master record carrier 63 and the replicate material 17 caused by strain forces in the rubber diaphragm 66, U.S. Patent Application Ser. No. 52,361 discloses the use of an isolating member 150 (see FIG. 10) disposed between the rubber diaphragm 66 and the master-replicate sandwich. The isolating member 150 is flexible in the direction of arrow 152, yet stiff (resists stretch and shrinkage due to applied strain forces) in the direction of arrow 154. Being flexible, the isolating member 150 conforms to the contour of the master-replicate sandwich during the contact printing process thereby producing uniform contact between the master and replicate devices. Because it is stiff, the isolating member 150 isolates the replicate material 17 from tensional and compressional forces in the rubber diaphragm 66. Absent the isolating member 150, it is believed that these forces in the rubber diaphragm 66 would be transmitted to the replicate material 17, causing it to stretch or shrink. Use of the isolating member 150, therefore, eliminates, or greatly reduces, the effect of this source of relative movement between the master record carrier 63 and the replicate material 17.

The stiffness of the isolating member 150 required for a particular application depends upon a combination of several factors: (1) the amount of relative movement that can be tolerated between the master record carrier and the replicate material, (2) the rigidity of the replicate material itself (a more rigid material resists stretch and shrinkage), (3) the amount of frictional engagement between the isolating member 150 and the rubber diaphragm 66, and (4) the amount of frictional engagement between the isolating member 150 and the replicate material 17.

As an example of a specific material suitable for use as the isolating member 150, a sheet of brass having a modulus of elasticity of $10.3 \times 10^{10}$ newtons per square meter and a thickness of 0.025 cm was cut to a circle 30 cm in diameter and attached to the rubber diaphragm 66 with a piece of double sided tape. This isolating member satisfactorily isolated the diazo replicate material from the tensional and compressional forces in the rubber diaphragm.

A similar result can be achieved by an isolating member comprised of other materials as well, each material having a thickness inversely dependent upon the materials' modulus of elasticity. A material having a high modulus of elasticity will thus permit the use of a thinner isolating member for a given stiffness. Use of a thin isolating member is advantageous because a thinner isolating member will have a better ability to conform to local thickness variations of the master-replicate sandwich. For example, the brass sheet material described above, with a modulus of elasticity of $10.3 \times 10^{10}$ newtons per square meter and a thickness of 0.025 cm may be replaced by a stainless steel sheet about 0.014 cm in thickness having a modulus of elasticity of $19.3 \times 10^{10}$ newtons per square meter, or a sheet of beryllium about 0.009 cm in thickness having a modulus of elasticity of $29 \times 10^{10}$ newtons per square meter. Relative to the brass isolating member, the stainless steel isolating member, because it is thinner, will have greater flexibility by a factor of about 3.5, and the beryllium will have a greater flexibility by a factor of about 7.8. It will be apparent to those of ordinary skill in the art that other materials may be used for the isolating member.

The result of using an isolating member having the described properties is shown in FIG. 11. The distortion pattern is still present but the lengths of the streaks have been greatly reduced (to about 7 percent of the original length). Regarding the remaining streaks, it is believed that the air bearing formed during the contact print exposure is so effective in lubricating the master-replicate interface that a super-sensitivity to relative thermal expansion occurs. Although it is known to filter out the infrared wavelengths of a radiation source to prevent damage from overheating, the present invention recognizes that the remainder of the streaks can be virtually eliminated by removing those wavelength ranges of the radiation source that cause relative thermal expansion of the master record carrier and the replicate material. Preferably, all wavelengths emitted by the source that are absorbed by the master record carrier or the replicate material, apart from the radiation used for exposure, and which give rise to relative thermal expansion of the master record carrier and the replicate material are filtered out.

FIGS. 12a and 12b show a filter 160 suitable for removing such radiation from a high intensity xenon flashlamp 90 mounted in the pyramidal reflector 89. The filter 160 is of a liquid type and contains an aqueous solution of 30 gm $CuSO_4.5H_2O$ and 400 ml of 15 molar $NH_4OH$ per liter of solution. Such a filter 0.6 cm in thickness has a transmission of 95 percent in the wavelength band (400 nm range) actinic to the diazo replicate material, and blocks the remainder of the visible and near infrared to 1 micron with a transmission of less than 10 percent. There is an infrared leak from 1 to 1.4 microns that can be blocked with heat-absorbing glass, although this has been found to be unnecessary when using a xenon flashlamp as the exposing source because of the absence of radiation in this band. It will be apparent that for other applications the aqueous solution used in the liquid filter will depend upon the wavelength range actinic to the photosensitive layer of the replicate material and upon those wavelength ranges that give rise to relative thermal expansion of the master record carrier and the replicate material. The type of filter-exposing source combination used will also depend upon the quality with which it is desired to replicate information. In the case of the replication of video information, all wavelengths should be filtered out that give rise to relative thermal expansion of the master record carrier and replicate material by such an amount as to cause appreciable distortion. In less stringent applications, the amount of relative thermal expansion that can be tolerated can be greater, so long as it does not become significant.

The liquid filter 160 has several distinct advantages over other types of filters. By using a pump 163 to circulate the liquid solution through a cooling unit 162, even a high intensity xenon flashlamp can be used without overheating the filter. Further, conventional glass heat absorbing filters have a gradual cut-off in the infrared and pass (with an attenuation of 10 to 15 percent) all of the visible radiation. As a result, much of the exposing radiation is not effective for the diazo exposure and is absorbed by the master record carrier and the replicate material, causing relative thermal expansion and thus image degradation. A gelatin filter (a Wratten No. 34, for example) can be added to the glass heat absorber so that the combination passes only that radiation effective for diazo exposure; however, peak transmission is only about 50 percent in the actinic wavelength range, thereby resulting in an inefficient exposure. Another problem with glass heat-absorbers is that they are generally not available in sizes large enough to cover the entire exposure plane for a 30 cm diameter videodisc.

Experiments were conducted to determine the relative effectiveness of the isolating member by itself, as opposed to the liquid filter by itself. As stated previously, for the particular setup described, use of the isolating member alone reduced the streak length to about 7 percent of its original value. On an identical setup, use of the liquid filter alone reduced the streak length to about 30 percent of the original value. Use of the isolating member in combination with the liquid filter as taught by the present invention substantially eliminated the streaks.

The invention has been described in detail with particular reference to preferred embodiments thereof, but it will be understood that variations and modifications can be effected within the spirit and scope of the invention.

What is claimed is:

1. Apparatus for use in contact printing information from a master record carrier onto a replicate material that emits a gas during the contact print exposure, said apparatus comprising:
    means for bringing the master record carrier and replicate material into contact;
    an isolating member resistant to stretch and compression disposed so as to be sandwiched between said contacting means and the contacted master record carrier and replicate material, thereby isolating the master record carrier and replicate material from strain forces from said contacting means; and
    a source of radiation for making the contact print exposure that does not expose the master record carrier and replicate material to radiation of a type that would cause significant relative thermal expansion of the master record carrier and replicate material.

2. Apparatus for use in contact printing video information from a master record carrier onto a diazo replicate material, said apparatus comprising:
    means for bringing the master record carrier and replicate material into contact to form a master-replicate sandwich;
    a stiff isolating member disposed so as to be sandwiched between said contacting means and said master-replicate sandwich, thereby isolating said master-replicate sandwich from tensional and compressional forces in said contacting means; and
    a source of radiation for making a contact print exposure that does not expose the master-replicate sandwich with radiation of a type that causes significant relative thermal expansion.

3. Apparatus as claimed in claim 2 wherein said source of radiation comprises a primary source of radiation and an optical filter, said optical filter passing radiation actinic to said diazo replicate material and absorbing those wavelengths of radiation emitted by said primary source of radiation that give rise to significant relative thermal expansion of the master record carrier and replicate material.

4. Apparatus as claimed in claim 3 wherein said filter is a liquid filter containing a liquid solution consisting essentially of 30 gm $CuSO_4.5H_2O$ and 400 ml of 15 molar $NH_4OH$ per liter of solution.

5. In apparatus for use in the contact print replication of information from a master record carrier onto a diazo replicate material comprising:
    (a) means for contacting the master record carrier and diazo replicate material; and
    (b) a source of radiation for exposing the replicate material through the master record carrier,
    the improvement further comprising:
    an optical filter for filtering from said source of radiation those wavelengths of radiation which otherwise would cause relative expansion by the master record carrier and replicate material by such an amount as to cause appreciable distortion to the replicated imagery.

6. Apparatus as claimed in claim 5 wherein said filter is a liquid filter about 0.6 cm in thickness containing a liquid solution consisting essentially of 30 gm $CuSO_4.5H_2O$ and 400 ml of 15 molar $NH_4OH$ per liter of solution.

7. In apparatus for use in contact printing information from a master record carrier onto a replicate material that emits a gas during the contact print exposure comprising:
    (a) means for bringing the master record carrier and replicate material into contact; and
    (b) a source of radiation for exposing the replicate material through the master record carrier with actinic radiation,
    the improvement wherein:
    said source of radiation is adapted so that the master record carrier and replicate material are not exposed with radiation of such wavelengths as to cause significant relative expansion of the master record carrier and replicate material.

8. In apparatus for use in contact printing information from a master record carrier onto a replicate material that emits a gas during the contact print exposure, the improvement comprising,
    a source of radiation for making the contact print exposure that does not expose the master record carrier and replicate material to radiation of such wavelengths as to cause significant relative expansion of the master record carrier and replicate material.

9. In apparatus for use in contact printing video information from a master record carrier onto a diazo replicate material, the improvement comprising,
    a radiation source for actinically exposing said diazo replicate material, but which is substantially free of radiation of such a wavelength as to cause relative thermal expansion of the carrier and material by such an amount as to produce appreciable distortion to the replicate imagery.

10. Apparatus as claimed in claim 9 wherein said source of radiation comprises a primary source of radiation and means for removing those wavelengths of radiation that would otherwise cause significant relative thermal expansion of the master record carrier and the replicate material.

11. Apparatus as claimed in claim 10 wherein said wavelength removing means is a liquid filter containing a liquid solution consisting essentially of 30 gm $CuSO_4 \cdot 5H_2O$ and 400 ml of 15 molar $NH_4OH$ per liter of solution.

12. Photographic apparatus for replicating information from a master record carrier onto diazo replicate material comprising:

means for pressing the replicate material into surface contact with the master record carrier, said pressing means having a surface for engaging the replicate material which surface is dimensionally stable throughout the range of pressures required for achieving the surface contact;

a source of actinic radiation for exposing said replicate material while in surface contact with said master record carrier; and means effective during exposure of said replicate material for filtering from said source radiation having wave lengths that would produce significant relative thermal expansion between the master record carrier and the replicate material.

13. In an apparatus for photographically replicating information from a master record carrier onto diazo replicate material and including a source of actinic radiation and means for positioning the master record carrier in surface contact with the replicate material during exposure with radiation from said source, the improvement comprising:

means for filtering from said source that radiation which would produce during exposure significant relative thermal expansion between the master record carrier and the replicate material.

* * * * *